June 18, 1935.  F. A. ANDERSON  2,005,214
SIGNAL APPARATUS
Filed April 24, 1933   2 Sheets-Sheet 1
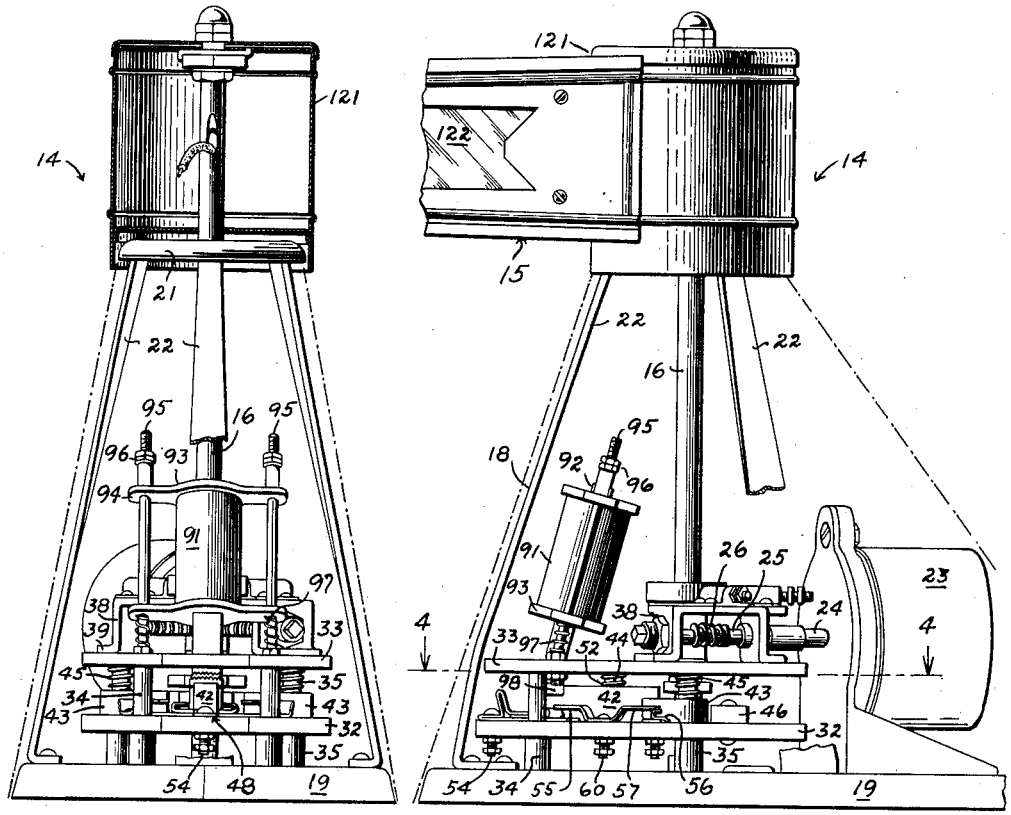
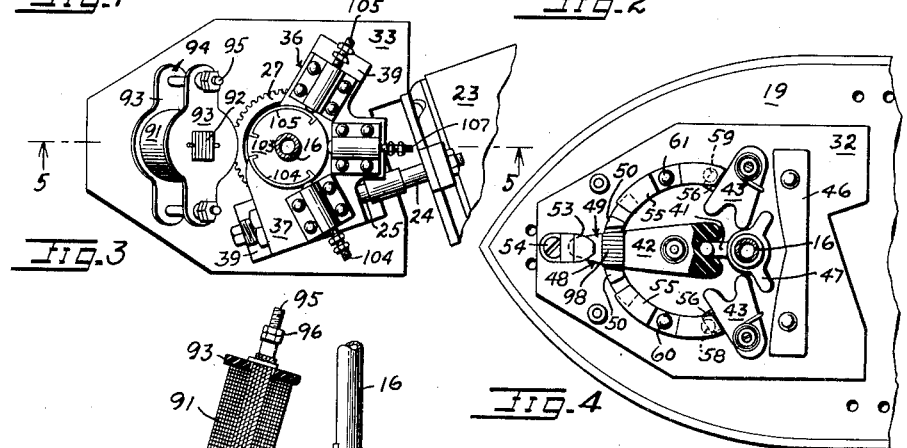
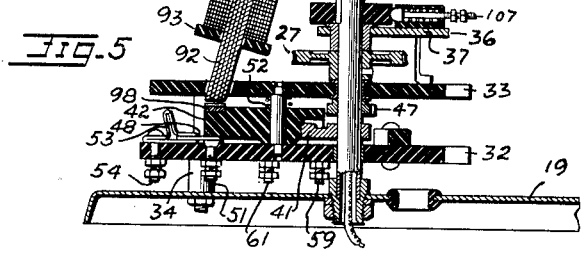
INVENTOR.
FRED A. ANDERSON
BY Henry N. Young.
ATTORNEY.

June 18, 1935.　　　　F. A. ANDERSON　　　　2,005,214
SIGNAL APPARATUS
Filed April 24, 1933　　2 Sheets-Sheet 2
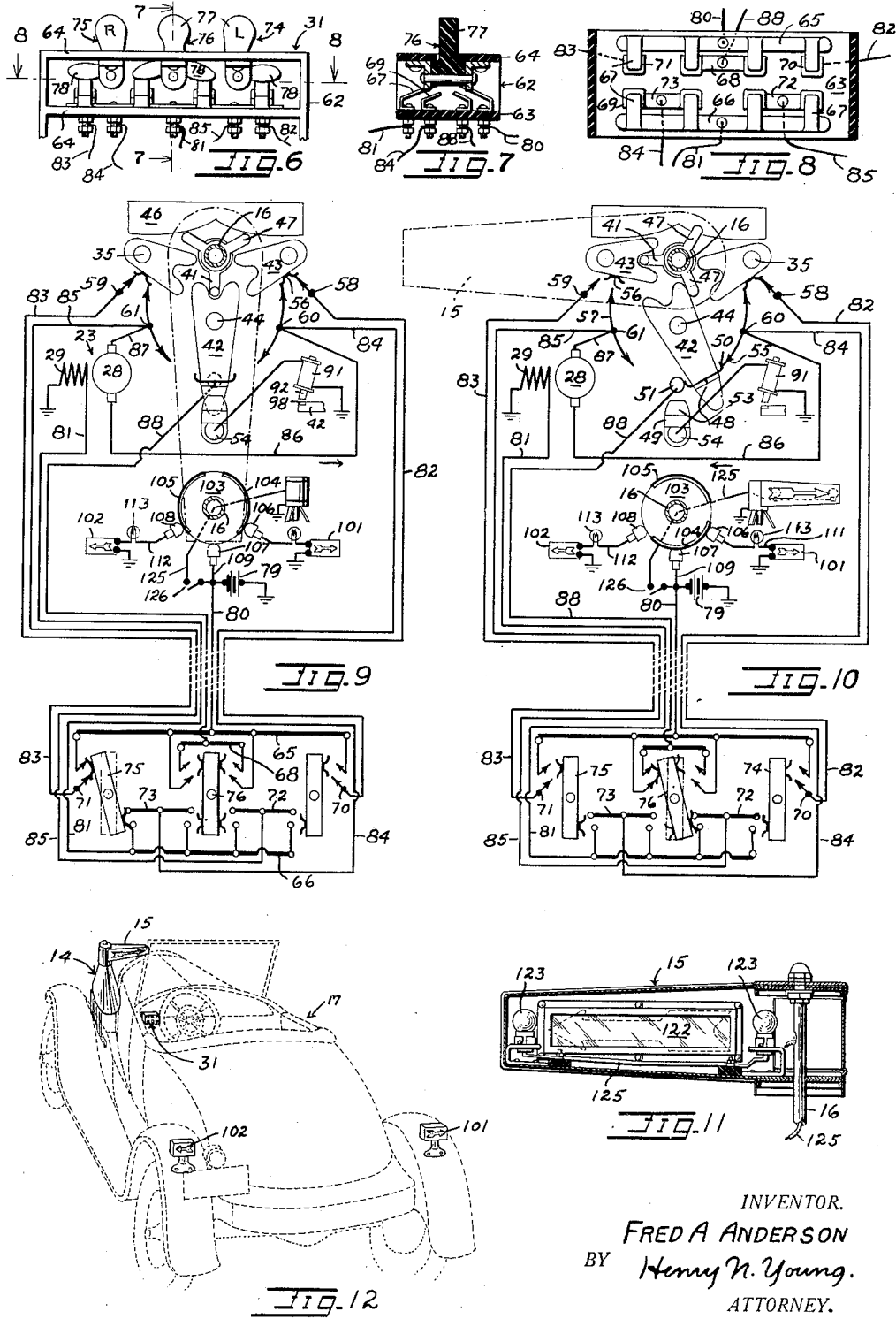
INVENTOR.
FRED A ANDERSON
BY Henry N. Young.
ATTORNEY.

Patented June 18, 1935

2,005,214

UNITED STATES PATENT OFFICE 2,005,214

SIGNAL APPARATUS

Fred A. Anderson, Oakland, Calif.

Application April 24, 1933, Serial No. 667,670

5 Claims. (Cl. 177—329)

The invention relates to apparatus particularly adapted for mounting on a dirigible vehicle for use in indicating intended changes in the direction of travel of the vehicle.

An object of the invention is to provide an improved means for controlling the disposal of a signal arm which is arranged for positioning in a plurality of signalling positions thereof.

Another object is to provide a generally improved electrical control means for use in apparatus of the class described.

A further object is to provide for the automatic actuation of a secondary signal means in synchronism with the signal arm.

A more general object is to provide an improved means for insuring the stoppage in an intermediate position thereof of a motor driven shaft which is arranged for oscillation between limiting positions thereof.

The apparatus possesses other objects and features of advantage, some of which, with the foregoing, will be set forth or be apparent in the following description of a preferred embodiment thereof, and in the accompanying drawings, in which, Figure 1 is an elevation of a portion of the apparatus, a swinging signal arm thereof being shown in section at the swinging axis thereof.

Figure 2 is a fragmentary elevation taken at right angles to the view of Figure 1.

Figure 3 is a fragmentary plan view of the arm-actuating mechanism of the apparatus.

Figure 4 is a plan view taken generally at 4—4 in Figure 2.

Figure 5 is a vertical section at 5—5 in Figure 3.

Figure 6 is a longitudinal section through a control switch of the apparatus.

Figure 7 is a section at 7—7 in Figure 6.

Figure 8 is a plan view at 8—8 in Figure 6.

Figures 9 and 10 are wiring diagrams for the apparatus, different operative conditions of the apparatus being shown in the respective figures.

Figure 11 illustrates generally an application of the apparatus to a motor vehicle.

Figure 12 is a perspective view showing the apparatus as operably installed on an automobile.

As is particularly illustrated, the features of the present invention are associated with a semaphore signal unit 14 wherein a signal arm 15 is mounted on an upright shaft 16 for swinging horizontally to and between different signalling positions thereof. As particularly shown in Figure 12, the unit 14 is adapted for mounting on an automobile 17, or other dirigible vehicle, whereby the disposal of the arm 15 with respect to the shaft 16 and the longitudinal axis of the vehicle may have signalling significance. In the present instance, the arm 15 may be swung to the left or right of a straight-ahead disposal thereof for indicating a left or right turn, the latter positioning of the arm being particularly indicated or shown in Figures 10 and 12.

A frame 18 mounts the shaft 16 for the rotation thereof, said frame comprising a base member 19 on which the lower shaft end is seated, an axially perforated top disc member 21 receiving the shaft through its perforation, and legs or struts 22 extending between the members 19 and 21 at spaced points about the edges thereof to define a space in which the arm-positioning mechanism is disposed. As shown, the frame 18 tapers upwardly, and said frame may be enclosed in a suitable casing or shell for protecting and concealing the mechanism within the frame space.

An electric motor 23 is mounted on the base 19, and the motor shaft 24 is coupled with a shaft 25 mounting a worm 26 which constantly meshes with a worm gear 27 fixed to the semaphore shaft 16. The motor 23 is of a reversible direct-current type having either its armature or field windings arranged for reversed connection in the motor power circuit whereby to effect the rotation of the motor shaft in a desired direction when power is supplied to the motor from an electric storage battery or other source of energy. By reference to Figures 9 and 10, it will be noted that the armature and field of the motor 23 are diagrammatically shown therein and are designated by the numerals 28 and 29 respectively. Suitable means are provided in the motor circuit for controlling the direction and degree of rotation of the semaphore shaft 16 as may be required or desired, said means comprising a switch assembly 31 for convenient disposal, as at the instrument board of the vehicle 17, for manual control, and other mechanism automatically controlled by the rotative disposal of the shaft 16.

By particular reference to Figures 1 to 5 inclusive, it will be noted that the mechanism which is controlled in accordance with the rotative disposal of the shaft 16 is carried on mutually spaced plate elements 32 and 33 which are mounted on and above the frame base in parallel relation thereto by use of suitable spacer posts 34 and 35. The plates 32 and 33 mount various electric terminals and are preferably formed of material which is electrically non-conductive whereby to simplify the matter of insulating the various connections provided. As shown, the upper plate 33 mounts an element 36 comprising a top plate portion 37 having depending legs 38 terminating at feet 39 which are fixed to the plate 33. The worm shaft 25 is journalled in and between a pair of the legs 38, and the worm gear 27 is fixed on the shaft 16 to lie in a plane through the axis of the shaft 25 while it meshes with the worm 26 on the latter shaft.

It will now be noted that the shaft 16 carries a radial arm 41 intermediate the plates 32 and 33 for effecting the rocking of switch arms 42 and 43, there being a pair of the latter. The arms 42 and 43 are formed of electrically non-conducting material, are mounted in the plane of movement of the shaft arm 41, and present forked ends for selectively receiving the shaft arm in their end slots for rocking the members therewith. As particularly shown the arm 42 is intermediately pivoted on a shaft 44 engaged with and between the plates 32 and 33, and extends radially of the shaft 16 when the signal arm 15 is in its intermediate, or straight-ahead, position.

The rear spacer posts 35 extend through the outer ends of the arms 43 to define the pivotal axes therefor, and are shown as disposed at equal distances from the plane defined by the shafts 16 and 44 and in a plane perpendicular to said first plane and including the axis of the shaft 16. Helical springs 45 encircle the posts 35 above the arms 43 and are operative between the arms and the posts to yieldingly urge a forwardly swung disposal of the arms in position to receive the end of the shaft arm in their slots as said arm end leaves the slot of the arm 42 after having displaced the same. As shown, the operative relation of the switch arms 42 and 43 to the shaft arm 41 is such that a ninety degree rotation of the shaft 16 from a straight-ahead setting of the signal arm to a right-turn positioning thereof shifts the arm 42 and one arm 43 as indicated in Figure 10, it being understood that the arm 42 and the other arm 43 are similarly shifted when the signal arm is set for a left-turn indication.

Preferably, and as shown, a block element 46 is fixed to the plate 32 as a stop for engaging the arms 43 to thereby positively limit the degree of swinging of the shaft and signal arm. As particularly shown, arms 47 extend radially from the shaft 16 above the shaft arm 41 for selective engagement with the displaced arm 42 for retaining the same in its limiting position when the arm 15 is in a right or left-turn signalling position thereof, the operation of an arm 47 in the described manner being indicated in Figure 10. To permit this operation of an arm 47, the member 42 is made somewhat thicker than the members 43 whereby the arms 47 may swing over the latter members for engaging the member 42 in the described manner.

A generally T-shaped conductor plate 48 is fixed on and beneath the forward end of the arm 42 to have its stem portion 49 extend longitudinally from said end and its arm portions 50 extend laterally from the same, the extending ends of said portions comprising movable contacts in the assembly. At its inner portion, the conductor 48 constantly rides over and engages the head of a terminal post 51 fixed in the plate 32. A spring 52 is engaged about the pivot shaft 44 and between the support plate 33 and the member 42 whereby to resiliently urge the latter downwardly for insuring the desired constant contact between the conductor 48 and the post 51. The protruding contact 49 of the conductor 48 is arranged to engage a spring terminal 53 extending from a post 54 fixed in the plate 32 when the member 42 is disposed generally in its straight-ahead position, and the protruding contacts 50 are arranged for selective engagement with spring contacts 55 mounted on the plate 42 in the path of swinging of the contacts 50 for engagement with the latter as the member 42 approaches a limit of its swing out of a straight-ahead positioning thereof.

Conductor elements 56 extend forwardly from the switch arms 43 and engage between spring contacts 57 and contacts comprising the heads of terminal posts 58 and 59 while said arms are forwardly disposed whereby to then electrically connect the contacts 57 with the terminal posts 58 and 59. The posts 58 and 59 are mounted in the plate 32, and the spring contacts 57 are connected with posts 60 and 61 with which the contacts 55 are also connected. In the present structure, the rearward ends of the contacts 57 provide the necessary stops for limiting the forward disposal of the members 43 which is urged through the action of the springs 45. It will be understood that the previously described devices for variously connecting the posts 51, 54, 58, 59, 60 and 61 are essentially switch means and that their specific structures are generally immaterial to the present invention.

The switch assembly 31, it will now be noted, includes certain switch mechanism for manual actuation to close various circuits for energizing the motor 23 to swing the signal arm from one position to the other. As particularly illustrated in Figures 6 to 8 inclusive, the switch mechanism for accomplishing the aforesaid purpose is mounted in an elongated and rectangular casing 62 formed of electrically non-conductive material and having contact elements and switch levers respectively carried on opposite walls 63 and 64 of the casing. Metallic strips 65 and 66 are secured to the inner face of the wall 63 to extend longitudinally thereof adjacent its side edges, and four equally spaced spring contacts 67 extend from each of said strips; as particularly illustrated, the contacts 67 comprise integral tongue portions of the strips 65 and 66, which portions extend upwardly and obliquely inwardly over and beyond the strips 65 and 66.

A conductor strip 68 underlies the two intermediate contacts 67 of the strip 65 and is provided with integral spring contacts 69 similar to the contacts 67 and disposed beneath the latter, the relation being brought out in Figure 7. Spring contacts 69 are also provided beneath the other two contacts 67 of the strip 65, said contacts extending from base strips 70 and 71 mounted on the wall 63. Conductor strips 72 and 73 underlie the end pairs of contacts 67 of the strip 66, these conductors providing spring contacts 69 beneath the various contacts 67 of the strip 66. The various strips and their contacts may be conveniently shaped from sheet metal having the necessary resiliency for providing the spring contacts.

It will now be noted that the contacts 67 and 69 of each cooperating pair are normally spaced apart and that a contact 67 must be sprung against an underlying contact 69 for closing an electric circuit including the pair of contacts. Furthermore, four different control circuits must be provided for selective energization whereby to dispose the arm 15 in right-turn and left-turn settings thereof and to return it to a neutral or straight-ahead setting from either signal setting.

In the present instance, the appropriate closing of circuits at the switch assembly 31 is arranged to be effected through appropriately rocking one of three levers 74, 75 and 76 mounted on the casing wall 64 and having arms 77 extending through said wall for manual actuation. Within the casing, the levers are provided with arms 78 which are formed to span aligned contacts 67 and simultaneously engage the same. The levers are pivoted for rocking about axes which are perpendicular to the longitudinal casing axis and parallel to the casing wall 63 whereby the rocking of a lever may simultaneously press two contacts 67 against the contacts 69 which underlie them. It is noted that each of the levers 74 and 75 has but one arm 78, while the lever 76 has two arms 78 in oppositely directed relation thereon.

Viewing the arrangement of Figure 6, it will be noted that an actuation of the lever 75 through displacing its arm 78 toward the adjacent casing end will engage two pairs of contacts 67 and 69, and that these contacts are in a circuit which may be energized to effect a right-turn disposal of the signal arm 15; a similar condition obtains for the control afforded through the lever 74, except that a left-turn signal disposal of the arm 15 is to be made when the arm 78 of this lever is pushed toward the other casing end. The lever 76 is provided for closing appropriate circuits for bringing the signal arm 15 back to its straight-ahead position, and the present arrangement is such that when the arm 78 of this lever is appropriately rocked a circuit will be closed for swinging the arm back from its signal setting.

The necessary connections for the aforesaid control include a wire 80 connected between the conductor strip 65 and the positive terminal of a storage battery 79, said battery arranged to supply the energy for operating the motor 23 and having its negative terminal grounded in a usual manner. The conductor strip 66 is connected to one terminal of the motor field winding 29 by means of a wire 81, the other terminal of said field winding being grounded. Wires 82 and 83 connect the contact bases 70 and 71 with the posts 58 and 59 respectively, while wires 84 and 85 connect the strips 73 and 72 with the posts 60 and 61 respectively. The different brushes of the motor armature 28 are connected to the posts 60 and 61 by means of wires 86 and 87 respectively. A wire 88 connects the strip 68 to the post 51.

Having the signal arm 15 in its straight-ahead, or neutral, position and the various other displaceable elements of the apparatus in the positions shown in Figure 9, a rocking of the lever 75 to engage the two pairs of contacts 67 and 69 controlled thereby results in closing a circuit from the battery 79 through the wire 80, the wire 83, the wire 87, the armature 28, the wire 86, the wire 84, the wire 81, the motor field 29, and to ground whereby the motor 23 is energized for rotating the shaft 16 to place the arm 15 in right-turn position. As the shaft 16 is rotated, the shaft arm 41 is operative to first rock the switch arm 42 to the position shown in Figure 10 wherein a contact 50 thereon engages the contact 55 which is connected to the post 60, and is thereafter operative to displace the arm 43 for opening the normally closed switch at the contact 57 and post 59 whereby the arm 15 completes its travel to its limiting position by reason of its inertia and that of the drive shafts and motor armature. Simultaneously with the stopping of the signal arm in its limiting position, the appropriate shaft arm 47 engages the switch arm 42 for holding the latter in set position in the previously described manner, it being noted that the worm-and-gear connection between the motor and the shaft 16 prevents a return movement of the arm 15 except by a reverse operation of the motor.

Having released the lever 75 after the signal arm 15 is in right-turn signalling position as shown in Figure 10, a return movement of the arm 15 to straight-ahead position may be effected by rocking the lever 76 to electrically connect the strip 72 with the strip 66 as is indicated in Figure 10. Under these conditions, a motor-energizing circuit is completed through the wire 80, the wire 88, the conductor plate 48, the wire 86, the motor armature 28, the wire 87, the wire 85, the wire 81, the armature 29, and to ground. As the energized motor rotates the shaft 16, the motor-operating circuit is broken at the contact 55 of the post 60 and the motor actuation ceases; in this manner, the arm 15 is restored to the straight-ahead position thereof, the contact 49 on the arm 42 again engages the contact 53 of the post 54, and the arm 43 is restored to its normal position for closing the gap between the post 59 and the contact 57 thereat.

It will now be particularly noted that in the last instance the current flow to the armature is opposite in direction to its flow while the arm 15 was being set in signalling position, and that in both cases a series connection is provided for the armature and field of the motor. Furthermore, an erroneous actuation of the switch lever 76 will have no effect since the other motor control circuit controllable therewith is open at the spring contacts 67 and 69 of the switch members 66 and 73. Since the present connections are symmetric for the right and left-turn circuits, it will be understood that corresponding relations exist for energizing the motor to swing the arm 15 to and from a left-turn position thereof.

In view of the fact that an opening of the motor power circuit as the signal arm is returned toward a neutral position thereof does not positively and immediately stop the movement of the rotating parts of the apparatus, means are preferably provided for positively stopping such movement when the signal arm is in a position intermediate its limiting positions and as it is swung back from a latter positioning thereof. In the present instance such means comprises an electro-magnetic friction brake which is operative against the arm 42 of the automatic switch mechanism of the unit 14 when said arm is in its intermediate position.

In its present form, the brake means comprises a solenoid 91 having a magnetic core 92 fixed therein and mounted above the outer end of the arm 42 for frictional engagement with the arm when the solenoid 91 is energized. As particularly illustrated, the solenoid 91 is formed between heads 93 each having a pair of ear portions 94 extending radially and oppositely therefrom. Rods 95 are mounted on the support plate 32 to extend upwardly therefrom in mutually parallel relation and through axially aligned perforations of the ears 94 whereby the solenoid is longitudinally slidable along the rods. Nuts 96 engage the upper rod ends to adjustably limit the upward movement of the solenoid thereon, and helical springs 97 are engaged about the rods between the lower solenoid in its raised position for the free movement of the member 42 beneath the lower end of its core.

It will now be noted that the solenoid core 92 extends freely through an opening in the plate 33 and that the member 42 carries a plate 98 of magnetic material for disposal beneath the lower core end when the member is disposed in the intermediate position thereof which it is arranged to assume when the signal arm is in straight-ahead position. When the solenoid is energized over the plate 98, the solenoid assembly is magnetically pulled downwardly whereby the opposed plate face and core end frictionally engage, said faces being preferably roughed for insuring a mutual gripping thereof. For energizing the solenoid when required, one terminal of its coil is connected with the terminal post 54 and the other coil terminal is grounded; in this manner, the coil will be energized whenever the contacts 49 and 53 are engaged and the switch lever 76 is held in circuit-closing position. Under the latter circumstances, the solenoid control current flows from the battery 79 through the wires 80 and 88, the contacts 53 and 49, the solenoid coil, and to ground. It will be understood that the present device for stopping the movement of the moving parts of the unit 14 in positions thereof intermediate their limiting positions is applicable to other apparatus than that herein particularly disclosed.

If it is desired to directly swing the signal arm 15 from one limiting position thereof to the other, it is merely necessary to actuate the appropriate hand switch lever 74 or 75. Thus, with the apparatus as shown in Figure 10, an actuation of the lever 74 to engage the contacts 67 and 69 controlled thereby results in the closing of a motor energizing circuit from the battery through the wire 80, the wire 82, the wire 86, the armature 28, the wire 87, the wire 85, the wire 81, the field winding 29 and to ground. The latter circuit is understood to effect a current flow through the armature in the same direction as when a circuit is closed through actuation of the switch lever 76 in the previously described manner, but is not opened until the shaft arm 41 engages the switch arm member 43 which controls the connection between the posts 58 and 60 to open the circuit between said posts. In this manner, the signal arm may be swung from one extreme signalling position to the other without effecting an actuation of the described brake mechanism.

When, as shown, the semaphore unit 14 is mounted at the front of a vehicle, it will usually be desirable to provide illuminated turn signals at the rear of the vehicle. In the present instance, the use of rear signal units 101 and 102 is indicated, said signals being of a usual structure providing direction arrows for signalling illumination by means of electric lamps (not shown) disposed in their casings, and means are provided for energizing the lamps of these signals when the arm 15 approaches and assumes a signalling position thereof. Accordingly, a commutator disc 103 is mounted on the shaft 16 above the top plate 37 of the element 36, said commutator providing mutually insulated contact segments 104 and 105. Brushes 106, 107, and 108 are mounted on the plate 37 in the plane of the commutator and in angularly spaced relation whereby the brushes 106 and 108 constantly engage the segments 104 and 105 respectively, while the brush 107 may selectively engage either segment in accordance with the direction of rotation of the shaft. The brush 107 is connected with the battery 79 by means of a wire 109, and the brushes 106 and 108 are connected with one terminal of the lamps of the units 101 and 102 by means of wires 111 and 112 respectively, the other terminals of said lamps being grounded. If desired, telltale lamps 113 may be connected in series with the lamps of the units 101 and 102, said lamps preferably disposed for viewing by the operator of the vehicle.

The signal arm 15 essentially comprises an elongated casing 121 having translucent panes 122 at opposite sides thereof and containing a pair of electric lamps 123 for energizing to illuminate said panes from within the casing. Direction arrows may be delineated on or in the panes 122 for indicating the significance of the disposition of the illuminated arm. For energizing the lamps 123, a wire 125 extends therefrom to the battery 79 through a switch 126, said switch preferably disposed within ready reach of the vehicle operator and being closed during conditions of darkness or fogginess. The shaft 16, it will now be noted, is tubular for receiving the wire 125 therethrough, and the lamps 123 are grounded through the casing 121 and the shaft 16 and the frame 18 whereby to minimize the amount of wiring required. It is noted that the described arrangement is diagrammatically included in the showing of Figures 9 and 10.

While I have described the principle of operation of a device which I now consider to be a preferred embodiment of my invention, I desire to have it understood that the embodiment shown is merely illustrative, and that such changes may be made, when desired, as fall within the scope of the appended claims wherein I claim as my invention, 1. In signalling apparatus of the character described, a rotatable shaft, a signal arm fixed to the shaft for swinging between a normal position thereof and a limiting signalling position thereof, a switch-actuating member rigid with said shaft, a reversible electric motor connected with said shaft for actuating the same, electric power circuits for said motor arranged for closing to actuate the motor to oppositely rotate said shaft, manually controlled and normally open switches for said circuits, and switches in said circuits which are independent of each other and of the shaft and member and include swingable arms for selective control by said switch-actuating member whereby only that said circuit may be closed by means of a said first switch which will energize the motor for rotating the shaft to shift the arm from either one of said positions to the other said position.

2. In signalling apparatus of the character described, a rotatable shaft, a signal arm fixed to the shaft for swinging to and between a pair of set positions thereof, a switch-actuating member rigid with said shaft, an electrically operable and reversible drive means for said shaft, power circuits for said drive means whereby to energize the same to actuate the shaft, and mutually independent switches each providing a pivoted switch arm in each said circuit for automatic actuation, by said actuating member in accordance with the setting of said signal arm whereby only that said circuit which will energize said drive means for swinging the arm from one said set position thereof to the other set position is closed at the appropriate said switch.

3. In signalling apparatus of the character described, a signal arm for swinging in opposite directions from an intermediate set position thereof to a pair of limiting set positions at opposite sides of said intermediate position, a reversible and electrically operable drive means for swinging said signal arm to and between said positions thereof, power circuits for said drive means operatively and structurally independent of said shaft and of said arm thereon for selective closing to energize the latter to swing said arm from or to said intermediate position to or from either said limiting position thereof, a switch-actuating arm extending rigidly from said shaft, and switch means including pivoted switch arms in said circuits for automatic control by said actuating arm in accordance with the disposal of said arm in a said limiting position whereby only that certain said power circuit may be closed which will energize the drive means to restore the arm to its intermediate position from said limiting position thereof.

4. In signalling apparatus of the character described, a signal arm, a shaft controlling said arm for selective oscillation between an intermediate setting thereof and limiting settings in both directions from said intermediate setting, a switch-actuating member carried by said shaft, an electrically operable and reversible drive means for said shaft, power circuits for said drive means including normally open switches for selective and manual closing when said signal arm is in the intermediate setting thereof to energize the drive means to effect a swinging of said signal arm to the appropriate said limiting position thereof, power circuits for said drive means including normally open switches for selective and manual closing when said signal arm is in a said limiting position thereof to energize the drive means to swing said arm from the limiting position to the intermediate position, normally closed switch means for each of the first power circuits and including a switch arm for displacement by said actuating member to open the operative circuit as the arm approaches its limiting position, and a normally open switch means for each of the second said power circuits and including a switch arm common to the latter circuits for automatic displacement by said switch actuating member to close solely that said second power circuit which must be energized to effect a return movement of the signal arm as the latter approaches a limiting setting thereof.

5. Mechanism in accordance with claim 4 wherein an electromagnetic braking means is provided for automatic co-operation directly with said last switch arm to stop the movement thereof and of the shaft as the signal arm approaches its intermediate setting by reason of the operation of the drive means through an energizing of the closed said second power circuit.

FRED A. ANDERSON.